United States Patent [19]

Baba

[11] Patent Number: 4,737,932

[45] Date of Patent: Apr. 12, 1988

[54] PROCESSOR

[75] Inventor: Eiji Baba, Tokyo, Japan

[73] Assignee: NEC Corporation, Tokyo, Japan

[21] Appl. No.: 741,141

[22] Filed: Jun. 4, 1985

[30] Foreign Application Priority Data

Jun. 5, 1984 [JP] Japan ............................ 59-114874

[51] Int. Cl.$^4$ .............................................. G06F 9/00
[52] U.S. Cl. ................................................. 364/900
[58] Field of Search ............................... 364/200, 900

[56] References Cited

U.S. PATENT DOCUMENTS

| | | | |
|---|---|---|---|
| 4,375,639 | 3/1983 | Johnson, Jr. .................... | 364/200 |
| 4,414,624 | 11/1983 | Summer et al. .................. | 364/200 |
| 4,481,572 | 11/1984 | Ochsner .......................... | 364/200 |
| 4,494,193 | 1/1985 | Brahm et al. .................... | 364/200 |

Primary Examiner—Gareth D. Shaw
Assistant Examiner—John G. Mills
Attorney, Agent, or Firm—Schwartz, Jeffery, Schwaab, Mack, Blumenthal & Evans

[57] ABSTRACT

A processor includes a central processing unit (CPU), a local memory and a local memory access device which are coupled to an internal bus, and an input/output (I/O) interface adapted to couple the internal bus to a system bus. The CPU generates a request signal for access to an external device coupled to the system bus and receives an acknowledgment signal for designating grant of usage of the system bus. The CPU releases the internal bus during the period of time from generation of the request signal until reception of the acknowledgment signal. Thus, the local memory access device can access the local memory during the period.

14 Claims, 3 Drawing Sheets

PROCESSOR

BACKGROUND OF THE INVENTION

1. Field of the Invention

The present invention relates to processors for use in a multiprocessor system and the like, and more particularly, to processors having a simple construction and an increased capacity of processing when it is used in a multiprocessor system.

2. Description of Related Art

In general, multiprocessor systems require that several processors constituting a multiprocessor system can use a so-called system bus provided in common to all the processors in the multiprocessor system, for example, for access to a large capacity of memory also provided in common in the multiprocessor system. For this purpose, it is necessary to arbitrate requests for the system bus use from the respective processors.

At the earliest stage in the development of multiprocessor system, there had been adopted a method in which when one processor uses the system bus, a HOLD command is given to the other processors to stop their operation. This method is advantageous in that, since no complicated function is needed for arbitrating the use requests of the system bus, the multiprocessor system is simple in the overall construction. However, while one processor uses the system bus, all the processors excluding that one processor have to stop their internal processing. Therefore, the processing capacity of the overall system will be greatly decreased when one processor accesses through the system bus to another external device such as the common memory.

In order to eliminate the above disadvantage, it has been recently proposed to provide a bus arbiter and to perform arbitration by utilizing a wait function of respective processors in a multiprocessor system.

FIG. 1 is a block diagram showing the construction of an exemplary multiprocessor system carrying out the aforementioned arbitrating method. The shown multiprocessor system comprises three processors 1, 2 and 3 and one common memory 4 which are coupled to a system bus 5. Furthermore, to the system bus 5 there is coupled a bus arbiter 6. The three processors 1, 2 and 3 have the same construction, and so, explanation will be made to only one of the processors, i.e., the processor 1. This processor 1 includes a central processing unit (CPU) 11, a local memory 12 and a local input/output (I/O) device 14 which are coupled to each other through an internal bus 15. In addition, an input/output (I/O) interface 16 is provided between the internal bus 15 and the system bus 5. The local I/O device 14 is adapted to be capable of accessing the local memory 12 without intermediary of the CPU 11 but under the control of a controller not shown or the like, so that so called direct memory access (DMA) is possible.

The I/O interface 16 comprises a decoder 20 having an input coupled to the internal bus 15 and an output coupled to a system bus use request (SBUR) line 21. This SBUR line 21 is coupled to the system bus 5 and one input terminal of an AND gate 22, an output of which is coupled to a control terminal of a bus buffer 23 through a bus buffer trigger line 24. The bus buffer 23 is coupled between the system bus 5 and the internal bus 15. The SBUR line 21 is also coupled to one input of another AND gate 25, whose output is coupled to the internal bus 15 through a WAIT line 26. Furthermore, a system bus use acknowledgment (SBUA) line 27 and an access completion line 28 extend from the system bus 5 to respective inputs of a NOR gate 29 which has an output coupled to the other input of the AND gate 25. The SBUA line 27 is also coupled to the other input of the AND gate 24.

With the above construction, when the CPU 11 of the processor 1 attempts to use the system bus 5 for access for example to the common memory 4, the CPU 11 delivers the address signal for the common memory 4, a control signal, and also data in the case of a writing, through the internal bus 15 to the I/O interface 16. The decoder 20 in the I/O interface 16 decodes a portion or all of the address and control signals input thereto and outputs on the SBUR line 21 a system bus use request (SBUR) signal of a logical high level, which is in turn input to the one input of the AND gate 25. At this time, since no signal is input to either of the two inputs of the NOR gate 29, the NOR gate 29 maintains its output coupled to the other input of the AND gate 25 at a logical high level. Therefore, the AND gate 25 enables the WAIT line 26 which is coupled through the internal bus 15 to the CPU 11. Thus, the CPU 11 is rendered to a WAIT condition while retaining the right to use the internal bus 15. On the other hand, since a signal is not supplied to the other input of the AND gate 22, the bus buffer 23 has not yet been triggered.

Furthermore, the SBUR signal on the line 21 is delivered through the system bus 5 to the arbiter 6. This arbiter 6 ceaselessly monitors the status of the system bus 5 and the condition of the system bus use requests from the respective processors, and furnishes a system bus use acknowledgment (SBUA) signal on the SBUA line 27 as soon as the access of the processor 1 to the system bus 5 becomes allowable. This SBUA signal on the line 27 is fed to the NOR gate 29 and the AND gate 22. As a result, the AND gate 22 enables the bus buffer trigger line 24 leading to the bus buffer 23, so that the address, the control signal and the data in the case of writing are outputted through the bus buffer 23 to the system bus 5 and then to the common memory 4.

When the access to the common memory 4 is completed, the common memory 4 outputs an access completion signal on the line 28 coupled through the system bus 5 to the processor 1, where it is inputted to one input of the NOR gate 29. At this time, since the SBUA signal has already been input to the other input of the NOR gate 29, the output of the NOR gate 29 is disabled. As a result, the AND gate 25 is closed, so that the WAIT signal disappears and the processor 11 is released from the WAIT condition.

In the conventional multiprocessor system as mentioned above, each of the processors 1 to 3 is no way unconditionally brought into a HOLD condition at every time one of the processors furnishes a system bus use request. However, as mentioned above, the CPU of each processor is rendered to the WAIT condition while retaining the right to use its internal bus from the time at which the same processor dispatches the system bus use request. Because of this, the following two significant problems have been encountered in the conventional multiprocessor system:

First, in the condition that many system bus used requests are rushed simultaneously or for a short time, a considerable number of processors would entail a long time from the moment of the dispatch of the system bus use request until the moment of the actual receipt of the system bus use acknowledgment. During the period of such a WAIT time, in the processor which has dispatched the system bus use request, even if an internal processing request is issued from the local I/O device or other devices to the local memory or other devices, since the internal bus is occupied or reserved by the CPU in the WAIT condition, the processor cannot carry out the internal processing. This results in decrease of the processing capacity of the individual processors.

Secondly, after the CPU of each processor supplies the internal bus with the address signal, the control signal and also the data signal to be outputted to the system bus, the CPU is put in the WAIT condition. Therefore, when the bus buffer in the I/O interface responds to the system bus use acknowledgment so as to output to the system bus the above signals supplied through the internal bus, it is necessary to newly adjust the output timing of these signals by using, for example, delay circuits or the like. Because of this, the bus buffer in the conventional system has a very complicated construction.

SUMMARY OF THE INVENTION

Accordingly, it is an object of the present invention to provide a processor capable of having an improved efficiency of processing when it is incorporated in a multiprocessor system.

Another object of the present invention is to provide such a processor having a simplified construction of an I/O interface which is located between an internal bus of the processor and a system bus of the multiprocessor system.

Still another object of the present invention is to provide a processor having a central processing unit (CPU), an internal (local) memory, an internal (local) bus coupled to the CPU and the internal memory, and means for coupling the CPU to an external (system) bus to which an external memory is coupled, in which processor an access to the internal memory can be permitted when the CPU is waiting the external bus use acknowledgment signal from an external bus control unit.

A further object of the present invention is to provide such a processor which can realize an improved efficiency of processing and a simplified I/O interface without increasing the number of control lines with the system bus of the multiprocessor system.

The above and other objects of the present invention is achieved by a processor constructed in accordance with the present invention which comprises a central processing unit (CPU), a local memory, a local memory access means which are coupled to an internal bus, the local memory access means being adapted to access the local memory through the internal bus, and an interface unit for communicatively coupling the CPU to a system bus. The processor further includes means for generating a system bus use request signal, means for receiving a system bus use acknowledgement signal, and means for releasing the internal bus from the CPU during the period of time from the moment the request signal is generated to the moment the acknowledgment signal is received.

With the above construction, when the system bus use request is generated, the internal bus is not retained by the CPU. In other words, after the CPU outputs the system bus use request and before it receives the system bus use acknowledgment, the CPU is maintained in the HOLD condition while abandoning use of the internal bus. In this processor. therefore, an internal processing can be carried out for example between the local memory access means and the local memory through the internal bus, with the result that the capacity of processing is increased in that degree.

Furthermore, the CPU starts accessing to the external after the system bus use is allowed. Therefore, it is not necessary for the I/O interface to newly adjust the output timing of the respective signals. Namely, the construction of the I/O interface can be simplified as much.

The above and other objects, features and advantages of the present invention will become apparent from the following detailed description of preferred embodiments of the present invention with reference to the accompanying drawing.

DESCRIPTION OF THE PREFERRED EMBODIMENTS

Figure 1:
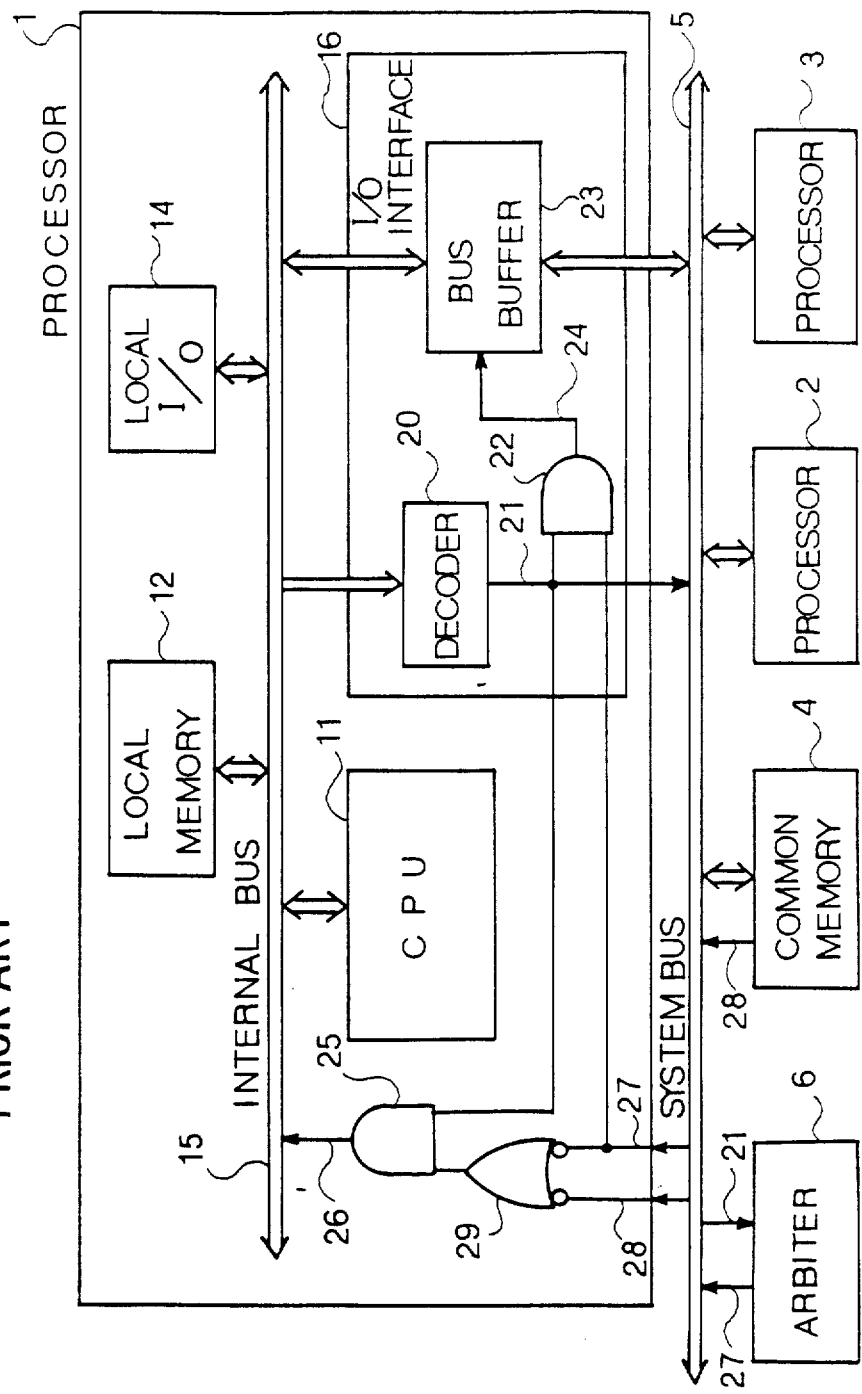
FIG. 1 is a block diagram showing the construction of a multiprocessor system constituted by conventional processors.
Figure 2:
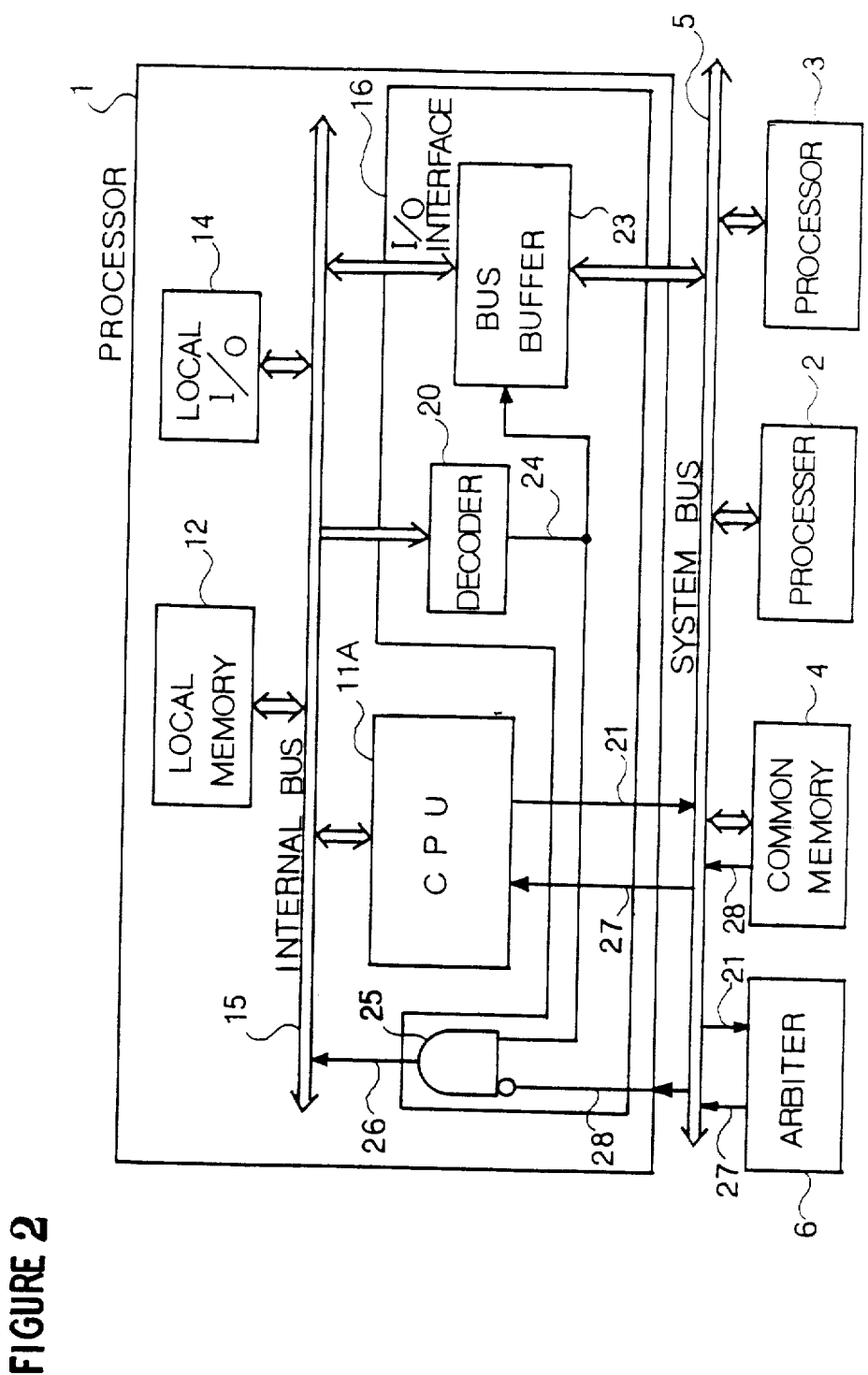
FIG. 2 is a block diagram showing the construction of a multiprocessor system constituted by processors constructed in accordance with the present invention.

Referring to FIG. 2, there is shown a multiprocessor system constituted by a plurality of processors constructed in accordance with the present invention. Portions similar to those in the system shown in FIG. 1 are given the same Reference Numerals.

The shown multiprocessor system comprises three processors 1, 2 and 3 and a common memory 4 which are coupled to each other through a system bus 5. In addition, a bus arbiter 6 is also coupled to the system bus so as to arbitrate system bus use requests from the respective processors 1, 2 and 3.

The three processors 1, 2 and 3 have the same construction, and therefore, only the processor 1 will be explained hereinafter. The processor 1 comprises a central processing unit (CPU) 11A, a local memory 12 and a local input/output (I/O) device 14 which are coupled to each other through an internal bus 15. In addition, an input/output (I/O) interface 16 is provided between the internal bus 15 and the system bus 5. For the direct memory access (DMA), the local I/O device 14 is adapted to be capable of accessing the local memory 12 without intermediary of the CPU 11 but under the control of another controller not shown or the like.

The above mentioned construction of the processor is the same as that of the conventional processor shown in FIG. 1. However, the CPU 11A is adapted to output a system bus use request (SBUR) signal through a line 21 directly to the bus arbiter 6 through the system bus 5 without intermediary of the internal bus 15. In addition, the I/O interface 16 includes a decoder 20 having an input coupled to the internal bus 15, but an output of the decoder 20 is coupled through a bus buffer trigger line 24 directly to a control terminal of a bus buffer 23 which is coupled between the system bus 5 and the internal bus 15. The bus buffer trigger line 24 is also coupled to a non-inverted input of an AND gate 25, whose output is coupled to the internal bus 15 through a WAIT line 26. Furthermore, a system bus use acknowledgment (SBUA) line 27 is coupled directly to the CPU 11A, and an access completion line 28 is coupled to an inverted input of the AND gate 25.

Figure 3:
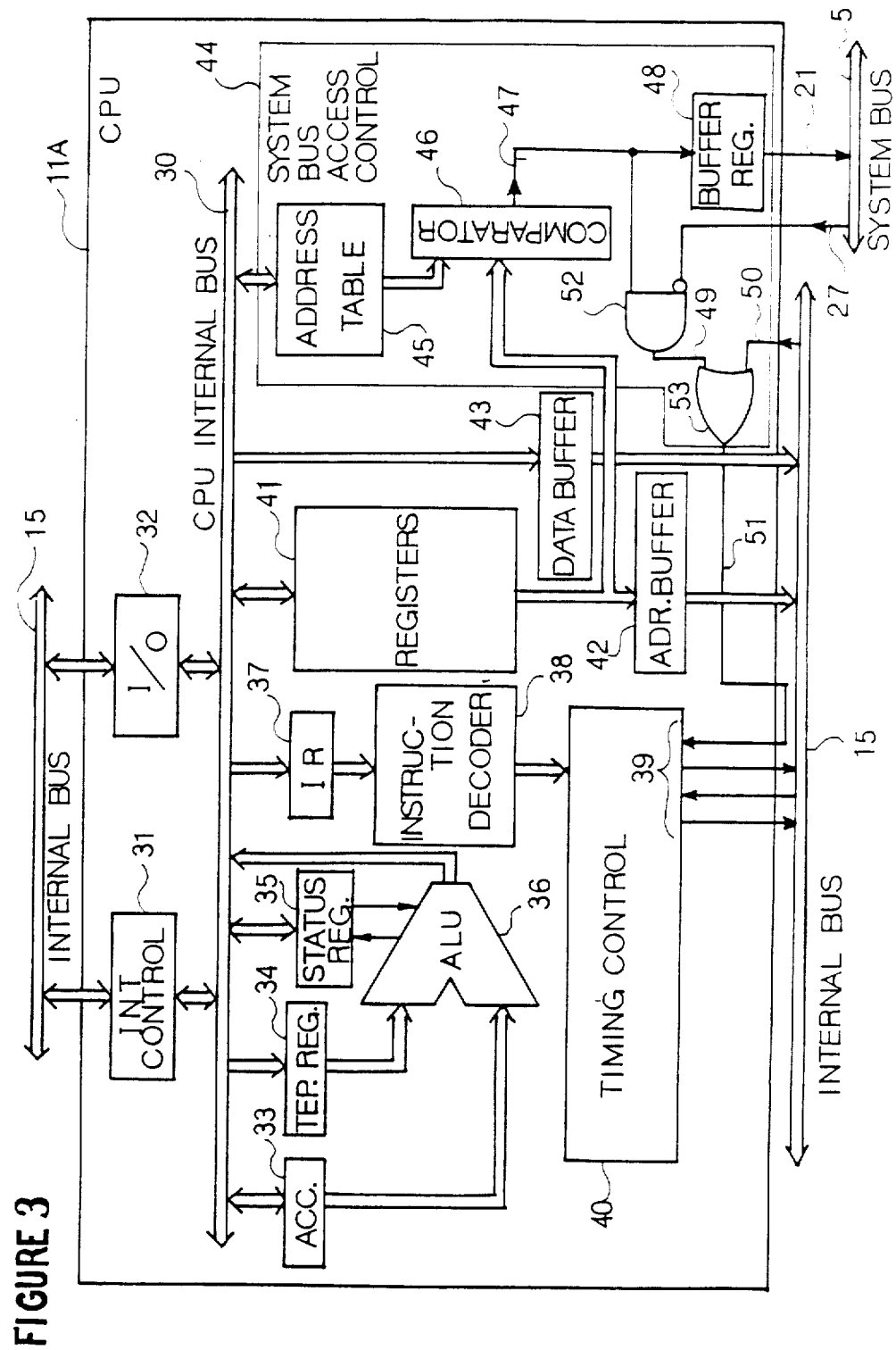
FIG. 3 is a block diagram showing the construction of a central processing unit incorporated in the processor shown in FIG. 2.

Turning to FIG. 3, there is shown one embodiment of the CPU 11A incorporated in the processor 1 shown FIG. 2. The CPU 11A shown includes a CPU internal bus 30, and an interrupt controller 31 and an input/output (I/O) device 32 which are coupled between the CPU internal bus 30 and the internal bus 15 of the processor 1. Furthermore, to the CPU internal bus 30 are coupled an accumulator 33, a temporary register 34 and a status register 35. Outputs of the accumulator 33 and the temporary register 34 are coupled to inputs of an arithmetic and logic unit (ALU) 36 which is controlled by the status register 35 and is adapted to respond to the status register 35. An output of the ALU 36 is coupled to the CPU internal bus 30. These elements 33 to 35 carries out the arithmetic logical processing.

The CPU 11A also comprises an instruction register 37 having an input coupled to the CPU internal bus 30 and an output coupled to an input of an instruction decoder 38. The instruction decoder 38 supplies its output to a timing controller 40 having input and output ports 39 for supplying and receiving various kinds of control signals to and from the internal bus 15 of the processor. In addition, there is a group of registers 41 including a program counter, which register group is coupled between the CPU internal bus 30 and an address buffer 42 having an output coupled to the internal bus 15 of the processor 1. A data buffer 43 is located between the CPU internal bus 30 and the internal bus 15 of the processor 1.

The aforementioned section of the CPU 11A is a general portion similar to that of the conventional CPU. In addition to the above section, the CPU 11A incorporated in the processor in accordance with the present invention includes a system bus access controller 44 for controlling the access to the system bus 5. This controller 44 comprises an address table 45 coupled to the CPU internal bus 30 and having an output coupled to one input of a comparator 46, the other input of which is adapted to receive the output of the register group 41. An output of the comparator 46 is coupled to an address consistence line 47 leading to a buffer register 48 whose output is coupled through the system bus use request (SBUR) line 21 to the system bus 5. In addition, the output of the comparator 46 is coupled to a non-inverted input of an AND gate 52, an inverted input of which is coupled to the system bus use acknowledgment (SBUA) line 27 extending from the system bus 5. An output of the AND gate 52 is coupled through a HOLD line 49 to one input of an OR gate 53 whose other input is coupled to a general HOLD line 50 which extends from the internal bus 15 of the processor 15 and is enabled at the time of DMA. An output of the OR gate 53 is coupled through a HOLD line 51 to the I/O ports 39 of the timing controller 40.

In operation, since the general portion constituted of the elements 31 to 43 in the CPU 11A is the same as that of the CPU of the conventional processor, that portion operates in similar manner. Briefly, the timing controller 40 generates timing signals and operates on the basis of the generated timing signals and various kinds of control signals received from the instruction decoder 38 so as to control the turn-on and turn-off of various gates (not shown) in the CPU 11A and at the same time to cause the address buffer 42 and the data buffer 43 to supply the address and data onto the internal bus 15.

Also, the timing controller 40 operates to control transfer of various control signals between the I/O ports 39 and the internal bus 15 of the processor 1. On the other hand, the instruction fed from the internal bus 15 to the I/O device 32 and written to the instruction register 37 through the CPU internal bus 30 is decoded by the instruction decoder 38 and then furnished to the timing controller 40.

When the processor 1 attempts to access the common memory 4 through the system bus 5, the CPU 11A writes to the address table 45 in the system bus access controller 44 an address discrimination information which makes it possible to discriminate whether the address set in the address buffer 42 is an internal address or an external address. Herein, the "internal address" means an address used for accessing to various devices in the processor 1 such as the local memory 12, and the "external address" means an address used for accessing through the system bus 5 to devices external to the processor 1 such as the common memory 4 or another processor. For example, these internal and external addresses are discriminated dependently upon the added device address or whether the value of the address is large or small. As a result, in the address table there is prepared a list of external address informations.

When such a writing operation to the address table 45 is completed, the general portion of the CPU 11A starts the ordinary operation mentioned above. At every advancement of the ordinary operation, the address, to which the CPU 11A should address at next, is set to the address buffer 42 from the program counter in the register group 41. The comparator 46 ceaselessly compares the address in the buffer register 42 with the external addresses set in the address table 45, and then enables the comparison consistence line 47 when it is an external address.

The signal on the comparison consistence line 47 is fed to the buffer register 48 which in turn outputs the SBUR signal on the SBUR line 21 leading to the system bus 5. At the same time, the signal on the comparison consistence line 47 is also entered to the non-inverted input of the AND gate 52. At this time, since the SBUA signal is not furnished to the SBUA line 27 leading to the inverted input of the AND gate 52, the AND gate delivers a HOLD signal for the CPU 11A on the HOLD line 49. This HOLD signal is supplied through the OR gate 53 and the HOLD line 51 to the HOLD control terminal of the timing controller 40.

In response to the HOLD signal, the CPU 11A releases the internal bus 15 as soon as the use of the internal bus 15 for the machine cycle being executed at that time is terminated. At the same time, the CPU 11A becomes the HOLD condition.

The arbiter 6 which has received the SBUR signal through the SBUR line 21, watches the status of the system bus 5 and the condition of all the system bus use requests pending at that time. When the use of the system bus 5 can be allowed for the processor 1, the arbiter 6 outputs a SBUA signal through the system bus 5 and the SBUA line 27 to the CPU 11A of the processor 1. Thus, the SBUA signal is applied to the inverted input of the AND gate 52, with the result that the HOLD signal supplied from the AND gate 52 to the timing controller 40 disappears, and therefore, the CPU 11A is released from the HOLD condition.

The CPU 11A released from the HOLD condition will start to execute the machine cycle following the cycle which has been executed just before the CPU 11A is shifted to the HOLD condition. As a result, the CPU 11A furnishes to the internal bus 15 the external address set in the address buffer 42 just before the CPU 11A has been shifted to the HOLD condition, and also the data stored in the data buffer 43 in the operation of writing. Sequentially, the timing controller 40 supplies a control signal from the control signal input and output ports 39 to the internal bus 15 after a delay of time predetermined by taking into account the time required before the address signal outputted to the internal bus 15 is established or clarified.

These external address, data and control signals are fed through the internal bus 15 to the I/O interface 16, where a portion or all of the address and control signals is decoded to the system bus use request by the decoder 20. This decoder 20 supplies the bus buffer trigger signal on the line 24 leading to the bus buffer 23. As a result, the address signal, the control signal and the data signal on the internal bus are furnished through the bus buffer 23 to the system bus 5. At the same time, the trigger signal on the bus buffer trigger line 24 is also supplied to the non-inverted input of the AND gate 25. At this time, an access completion signal is not fed to the inverted input of the AND gate 25, the AND gate 25 supplies a WAIT signal through the line 26 and the internal bus 15 to the CPU 11A. This condition is maintained until the access completion signal is fed from for example the common memory 4 through the system bus 5 and the access completion line 28 to the inverted input of the AND gate 25. Thereafter, the CPU 11A is released from the WAIT condition.

As seen from the above description, the above processor in accordance with the present invention is adapted to furnish the system bus use request without intermediary of the I/O interface and at the same time to bring the internal CPU into the HOLD condition. Then, after the system bus use acknowledgment is received, the processor releases the internal CPU from the HOLD condition and starts to access the external of the processor. Therefore, the processor can carry out an internal processing required during the period of time from the time the processor furnishes the system bus use request to the time it receives the system bus use acknowledgment. Accordingly, the capacity of processing is increased by that degree.

Furthermore, the aforementioned processor is constructed to cause the internal CPU to start the access to the external through the I/O interface after the system bus becomes usable. Therefore, it does not need that the I/O interface newly adjusts the respective signals fed through the I/O interface, in timing to each other. Thus, the I/O interface can be simplified as much in construction.

In addition, the processor can achieve the above mentioned operation with only the three control lines 21, 27 and 28 which are used in the conventional processor. Therefore, this processor is compatible to the conventional multiprocessor system.

In the embodiment mentioned above, the system bus access controller 44 is provided in the interior of the CPU 11A. However, if an exclusive line is provided to transfer the content of the address buffer to a address comparator external to the CPU through no intermediary of the internal bus, the controller 44 can be provided in the I/O interface or installed as an independent circuit in the processor.

In the above embodiment, the AND gate 25 is located in the I/O interface 16, but can be provided in the CPU 11A. Further, the bus arbiter is provided independently of the processors coupled to the system bus. But, the independent arbiter can be omitted by distributing the function of the arbiter to the respective processors.

In addition, the above explanation is directed to the explanation is directed to the embodiment of the processors in accordance with the present invention installed in the multiprocessor system. However, the processor in accordance with the present invention can be used in a single processor system, for example by replacing all the processors in the aforementioned multiprocessor system excluding one processor in accordance with the present invention by input/output devices. In such a case, the present invention provides an excellent advantage similar to that obtained in the multiprocessor system.

The invention has thus been shown and described with reference to specific embodiments, however, it should be noted that the invention is in no way limited to the details of the illustrated structures but changes and modifications may be made within the scope of the appended claims.

What is claimed is:

1. A processor comprising: a central processing unit (CPU), a local memory and a local input/output (I/O) device which are coupled to an internal bus, an input/output (I/O) interface adapted to couple said internal bus to a system bus external to the processor, said CPU being adapted to output an address signal when it is about to access a device external to said CPU, said I/O device being adapted to access said internal memory through said internal bus, and a system bus access controller including:

first means for receiving said address signal output from said CPU and transmitting a system bus use request (SBUR) signal to said system bus without using said internal bus when said address signal designates an access to a device external to the processor; and second means for receiving said system bus use request (SBUR) signal from said first means and a system bus use acknowledgment (SBUA) signal from said system bus, said second means operating to put said CPU in a HOLD condition after said system bus use request (SBUR) signal is transmitted until said system bus use acknowledgment (SBUR) signal is received, thereby permitting said local memory, said local input/output device, or said input/output interface to utilize said internal bus when said CPU is in said HOLD condition.

2. A processor as set forth in claim 1 wherein said CPU includes a CPU internal bus, a timing controller, a group of registers coupled to said CPU internal bus, and an address buffer coupled to said register group and adapted to supply said address signal to said internal bus of the processor, and wherein said first means includes an address table storing a discrimination information for an external address, and a comparator adapted to compare said address in said address buffer with the address discrimination information in said address table and to output said system bus use request (SBUR) signal to said system bus when said address signal designates access to a device external to the processor, and said second means includes a gate means for receiving said SBUR signal and said SBUA signal so as to output a HOLD signal to said timing controller after said SBUR signal is generated until said SBUA signal is received, thereby putting said CPU in said HOLD condition.

3. A processor as set forth in claim 2 wherein said system bus access controller further includes a buffer register having an input coupled to the output of said comparator and an output coupled to said system bus, thereby supplying said SBUR signal stored in said buffer register to said system bus.

4. A processor as set forth in claim 2 wherein said gate means is composed of an AND gate having a non-inverted input coupled to the output of said comparator and an inverted input connected to said system bus so as to receive said system bus use acknowledgment (SBUA) signal from said system bus, so that said AND gate enables said HOLD signal when the output of said comparator is enabled and said SBUA signal is in a disabled condition.

5. A processor as set forth in claim 4 wherein when said system bus use acknowledgment (SBUA) signal is input, said AND gate disables said HOLD signal so that said CPU goes out of the HOLD condition so as to supply to said I/O interface at least the address signal stored in said address buffer just before said CPU entered the HOLD condition.

6. A processor as set forth in claim 5 wherein said I/O interface includes a bus buffer coupled between said internal bus of said processor and said system bus, a decoder having an input coupled to said internal bus of said processor for receiving at least a portion of said address signal and said control signal supplied from said CPU so as to supply a trigger signal to said bus buffer, and a second gate means in response to said trigger signal to generate and supply a WAIT signal to said CPU through said internal bus of said processor.

7. A multiprocessor system comprising: a plurality of processors, a common memory, a bus arbiter, and a system bus coupled to said processors, said common memory and said bus arbiter, each of said processors including a central processing unit (CPU), a local memory and a local input/output (I/O) device which are coupled to an internal bus, and an input/output (I/O) interface adapted to couple said internal bus to said system bus which is external to said processors, said CPU being adapted to output an address signal when it is about to access a device external to said CPU, said (I/O) device being adapted to access said internal memory through said internal bus, wherein at least one processor also comprises a system bus access controller including first means for receiving said address signal output from said CPU and transmitting a system bus use request (SBUR) signal through said system bus to said bus arbiter when said address signal designates an access to a device external to the processor; and second means receiving said system bus use request (SBUR) signal from said first means and a system bus use acknowledgment (SBUA) signal through said system bus from said bus arbiter, said second means operating to put said CPU in a HOLD condition after said system bus use request (SBUR) signal is transmitted until said system bus use acknowledgment (SBUA) signal is received from said bus arbiter, thereby permitting said local memory, said local input/output device, or said input/output interfere to utilize said internal bus when said CPU is in said HOLD condition.

8. A multiprocessor system as set forth in claim 7 wherein said CPU of said one processor includes a CPU internal bus, a timing controller, a group of registers coupled to said CPU internal bus, and an address buffer coupled to said register group and adapted to supply said address signal to said internal bus of the processor, and wherein said first means includes an address table storing a discrimination information for an external address, and a comparator adapted to compare said address in said address buffer with the address discrimination information in said address table and to output said system bus use request (SBUR) signal to said system bus when said address signal designates access to a device external to the processor, and said second means includes a gate means for receiving said SBUR signal and said SBUA signal so as to output a HOLD signal to said timing controller after said SBUR signal is generated until said SBUA signal is received, thereby putting said CPU in said HOLD condition.

9. A multiprocessor system as set forth in claim 8 wherein said system bus access controller further includes a buffer register having an input coupled to the output of said comparator and an output coupled to said system bus, thereby supplying said SBUR signal stored in said buffer register through said system bus to said bus arbiter.

10. A multiprocessor as set forth in claim 8 wherein said gate means is composed of an AND gate having a non-inverted input coupled to the output of said comparator and an inverted input connected to said system bus so as to receive said system bus use acknowledgment (SBUA) signal transmitted through said system bus from said bus arbiter, so that said AND gate enables said HOLD signal when the output of said comparator is enabled and said SBUA signal is in a disabled condition.

11. A multiprocessor system as set forth in claim 10 wherein when said one processor receives said system bus use acknowledgment (SBUA) signal, said AND gate of said processor disables said HOLD signal so that said CPU goes out of the HOLD condition so as to supply to said I/O interface at least the address signal stored in said address buffer just before said CPU entered the HOLD condition.

12. A multiprocessor system as set forth in claim 11 wherein said I/O interface of said CPU of said one processor includes a bus buffer coupled between said internal bus of said processor and said system bus, a decoder having an input coupled to said internal bus of said processor for receiving at least a portion of said address signal supplied from said CPU so as to supply a trigger signal to said bus buffer, and a second gate means in response to said trigger signal to generate and supply a WAIT signal to said CPU through said internal bus of said processor.

13. A multiprocessor system as set forth in claim 12 wherein said second gate means is composed of a second AND gate having a non-inverted input coupled to the output of said decoder and an inverted input connected to said system bus to receive an access completion signal when the access to the external of the processor is completed, said second gate operating to disable said WAIT signal at the receipt of said access completion signal so that said CPU goes out of said WAIT condition so as to carry out the next operation.

14. A multiprocessor system as set forth in claim 7, wherein said CPU of said at least one processor further includes third means for releasing said internal bus from said CPU during the period of time from the moment said system bus use request signal is generated until said system bus use acknowledgment signal is received from said bus arbiter, so that at least said local input/output device can perform an access directly to said local memory during said period of time.

* * * * *